United States Patent
Shivanna et al.

(10) Patent No.: US 10,430,202 B2
(45) Date of Patent: Oct. 1, 2019

(54) DUAL PURPOSE BOOT REGISTERS

(71) Applicants: Hewlett Packard Enterprise Development LP, Houston, TX (US); Suhas Shivanna, Bangalore (IN); Srinivasan Varadarajan Sahasranamam, Bangalore (IN); Nagaraj S Salotagi, Bangalore (IN)

(72) Inventors: Suhas Shivanna, Bangalore (IN); Srinivasan Varadarajan Sahasranamam, Bangalore (IN); Nagaraj S Salotagi, Bangalore (IN)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 104 days.

(21) Appl. No.: 15/526,459

(22) PCT Filed: Nov. 13, 2014

(86) PCT No.: PCT/IN2014/000719
§ 371 (c)(1),
(2) Date: May 12, 2017

(87) PCT Pub. No.: WO2016/075699
PCT Pub. Date: May 19, 2016

(65) Prior Publication Data

US 2017/0315818 A1    Nov. 2, 2017

(51) Int. Cl.
*G06F 9/4401*    (2018.01)
*G06F 11/00*    (2006.01)
(Continued)

(52) U.S. Cl.
CPC .............. *G06F 9/441* (2013.01); *G06F 1/263* (2013.01); *G06F 1/266* (2013.01); *G06F 1/3296* (2013.01);
(Continued)

(58) Field of Classification Search
CPC ....................................................... G06F 9/441
See application file for complete search history.

(56) References Cited

U.S. PATENT DOCUMENTS 6,233,680 B1    5/2001    Bossen et al.
6,393,586 B1    5/2002    Sloan
(Continued)

FOREIGN PATENT DOCUMENTS

| TW | 201324115 A1 | 6/2013 |
| TW | 201418979 A | 5/2014 |
| WO | WO-2012087330 A2 | 6/2012 |

OTHER PUBLICATIONS

Unknown, "Workspace On-demand Handbook", IBM International Technical Support Organization Austin Center, Dec. 1997, 370 pages.

(Continued)

*Primary Examiner* — Kim Huynh
*Assistant Examiner* — Eric Chang
(74) *Attorney, Agent, or Firm* — Hewlett Packard Enterprise Patent Department

(57) ABSTRACT

Techniques for detecting an early boot error are provided. In one aspect, a host processor may transition to a first phase of an early boot process. The early boot process may occur before the host processor initializes a primary link between the host processor and a management controller. The host processor may then update a dual purpose boot register to (Continued)

store an early boot phase identifier corresponding to the first phase and an early boot status identifier corresponding to the first phase.

17 Claims, 4 Drawing Sheets

(51) Int. Cl.
    *G06F 3/06*         (2006.01)
    *G06F 15/177*     (2006.01)
    *G06F 11/07*       (2006.01)
    *G06F 11/22*       (2006.01)
    *G06F 11/14*       (2006.01)
    *G06F 1/26*        (2006.01)
    *G06F 1/3296*     (2019.01)

(52) U.S. Cl.
    CPC .............. *G06F 3/06* (2013.01); *G06F 9/4405* (2013.01); *G06F 11/00* (2013.01); *G06F 11/0721* (2013.01); *G06F 11/0772* (2013.01); *G06F 11/0787* (2013.01); *G06F 11/0793* (2013.01); *G06F 11/1417* (2013.01); *G06F 11/1471* (2013.01); *G06F 11/22* (2013.01); *G06F 11/2284* (2013.01); *G06F 15/177* (2013.01)

(56) References Cited

U.S. PATENT DOCUMENTS

| | | | |
|---|---|---|---|
| 6,807,643 | B2 | 10/2004 | Eckardt |
| 7,310,744 | B2 | 12/2007 | Maity et al. |
| 7,734,945 | B1 | 6/2010 | Levidow |
| 9,946,553 | B2 * | 4/2018 | Parthiban .............. G06F 9/4401 |
| 2002/0099971 | A1 | 7/2002 | Merkin et al. |
| 2003/0070115 | A1 | 4/2003 | Nguyen |
| 2004/0177241 | A1 | 9/2004 | Chen et al. |
| 2005/0038981 | A1 | 2/2005 | Connor et al. |
| 2005/0038985 | A1 | 2/2005 | Taylor |
| 2005/0289335 | A1 | 12/2005 | Fajar |
| 2007/0157011 | A1 * | 7/2007 | Kumar ................ G06F 11/1417 |
| | | | 713/1 |
| 2014/0241071 | A1 | 8/2014 | Goss et al. |

OTHER PUBLICATIONS

Ridder, D. "Understanding and Troubleshooting EXSeries Personal Telepresence Systems, MX-Series and C-Series Codecs", CiscoLive!, Technical Lead Services, Jan. 30, 2013, 143 p.

International Searching Authority, "Notification of Transmittal of the International Search Report and the Written Opinion", dated Jul. 30, 2015, PCT/IN2014/000719, 10 pages.

Ridder, D. "Understanding and Troubleshooting EXSeries Personal Telepresence Systems, MX-Series and C-Series Codecs", (Research Paper) Jan. 30, 2013, 143 pages.

* cited by examiner

DUAL PURPOSE BOOT REGISTERS

BACKGROUND

As the number of computer servers used by businesses has substantially increased, a number of techniques have been developed to remotely manage the operation and inventory of such servers. For example, large data centers are frequently managed using a variety of different remote management tools, including, e.g., simple terminal connections, remote desktop applications and sophisticated software tools used to configure, monitor, and troubleshoot both computer hardware and software.

DETAILED DESCRIPTION

Figure 1:
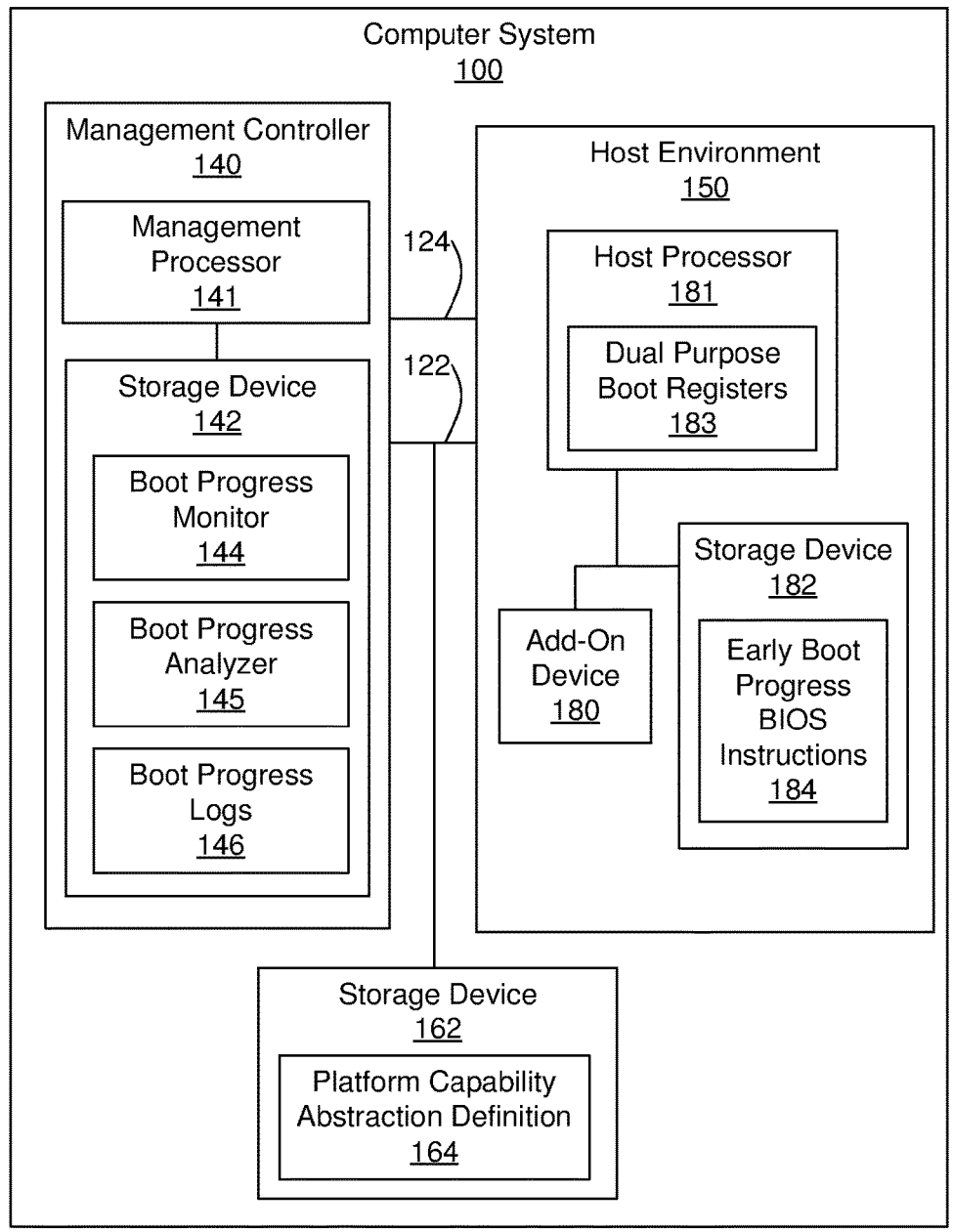
FIG. 1 is block diagram illustrating a computer system that may utilize techniques for tracking early boot errors, according to an example.

With commoditization of servers, advanced Reliability, Availability and Supportability (RAS) is receiving increasing focus for differentiating products. In many cases, a server can fail without any event trace after a power on operation. There are other failure types reported both during development and field with one or many cores failing to respond to resets due an error condition, resulting in the server entering not bootable state. These types of failures also sometimes called as "dead on arrival" or "dead on reboot" is a common occurrence and analyzing such failures without any kind of logs/events is mostly a trial and error operation, which impacts availability and serviceability of the servers.

One attempt to track a boot status of a server may involve the basic input/output system (BIOS) of the server initializing a console/video interface during the boot cycle. This helps in detecting failures that happens after the initialization of drivers for console/video, but does not help to detect failures that happen in the early part of the server boot process. Also, the use of the console/video interface creates a coupling between the host system and the error detection unit.

Examples discussed herein may provide a generic real-time solution that helps in capturing and analyzing early boot logs and events from a server's management processor for root causing early boot failures in the factory and the field. Such a feature may improve availability and supportability of these servers. As used herein, an early boot process may refer to a sub-process of booting a host environment of a computer system that occurs before the primary communication interfaces of the host environment are initialized. An example of primary communication interfaces may include, but are not limited to, such high speed links, such as peripheral component interconnect (PCI), PCI eXtended (PCI-e), accelerated graphic ports, PCI express (PCIe), or any other suitable communication interface powered by the host environment.

Examples discussed in the foregoing may provide a host environment that provides a generic framework for signaling early boot phases and status in dual purpose registers of the host environment. For example, a host processor may transition to a first phase of an early boot process. The early boot process may occur before the host processor initializes a primary link between the host processor and a management controller. The host processor may then update a dual purpose boot register to store an early boot phase identifier corresponding to the first phase and an early boot status identifier corresponding to the first phase.

In another example, a management controller may access the dual purpose registers to track the boot phases of the host environment and the status thereof. This may occur in substantially real time. For example, a device may include a side-band interface communicatively coupled to a host environment, a processor (e.g., a management processor), and a computer-readable storage device coupled to the processor. The computer-readable storage device may contain instructions to cause the processor to obtain a boot phase identifier and boot status of the host environment based on accessing a dual purpose boot register of a host processor through the side-band interface. The processor may store the boot phase identifier and the early boot status identifier in an early boot progress log, The processor may also analyze the early boot progress log to detect an early boot error occurring within the host environment. In some cases, the processor may invoke self-healing actions to mitigate the issue (e.g., invoke a system reset).

These examples and others are now described in the foregoing,

For example, FIG. 1 is block diagram illustrating a computer system 100 that may utilize techniques for tracking early boot errors, according to an example, In some cases, the computer system 100 may represent a network device, such as a server, router, switch, and the like. In other cases, the network device may represent any suitable computer device, such as a desktop, laptop, game console, set top box, tablet, mobile phone, or the like. With reference to FIG. 1, the computer system 100 may include a management controller 140 and a host environment 150.

The management controller 140 may be a baseboard management controller. The management controller may remain powered on and accessible to a client, even when the remainder of the computer system 100 is not powered on. Thus, a client may still access the management controller 140, even when the remainder of computer system 100 is unavailable. Furthermore, the management controller 140 may be accessible over a different communications path than that which is used to communicate with the host environment 150. Thus, the management controller may be referred to as being accessible out-of-band.

The management controller 140 may include a management processor 141 and a computer-readable storage device 142. The management processor 141 may be a device suitable to read and execute processor executable instructions, such as a CPU or integrated circuit. The processor executable instructions may cause the management processor 141 to implement techniques described herein. For example the management processor 141 my execute instructions for detecting a boot failure in the computer system 100.

The management processor 141 may be coupled to the computer-readable storage device 142. The computer-readable storage device 142 may contain thereon a set of instructions, which when executed by the management processor 141, cause the management processor 141 to execute the techniques described herein. For example, the medium may include the boot progress monitor instructions 144 and boot progress analyzer instructions 145. Execution of these instructions, whole or in part, may cause the management processor 141 to detect an occurrence of a boot error in the computer system 100. For example, the boot progress monitor instructions 144 may collect and monitor the progress of the early boot process occurring within the host environment 150.

The boot progress analyzer instructions 145 may, in some cases, decode the boot progress logs based on the platform abstraction definition and perform online analysis to detect failure in early boot which includes cores not responding use cases. In some cases, if the boot progress log analyzer detects a halt of the boot process due to an error condition that is considered as transient, based on the phase, the boot progress analyzer 145 can take appropriate action by informing a boot progress watchdog component to trigger a system reset after a configurable time. This reset will help to recover from certain transient uncorrectable errors, thereby helping improve system availability. The boot progress analyzer instructions 145 may check for boot progress register update from the first BIOS instruction to isolate problems between hardware, power subsystem and processor initialization code. The boot progress analyzer instructions 145 can, in some cases, validate if the cores of the host environment 150 have successfully initialized. Using the error code and the phase specified by an error logged in the boot progress logs, the boot progress analyzer instructions 145 can give appropriate cause and action recommendations to a customer and/or support engineer. The boot progress analyzer instructions 145 can be designed to run both in offline (using logs stored in persistent memory) and online mode, The analysis results can be stored in nonvolatile memory.

The computer-readable storage device 142, as shown in FIG. 1, may also store early boot progress logs 146. The early boot progress logs 146 may be data recorded by the management controller that track the early boot phases of the host environment 150 and corresponding status of those early boot phases. Thus, the management controller can store the early boot progress logs 146 in persistent storage.

The host environment 150 may include devices that support the underlying execution environment for computer system 100. For example, where the computer system 100 is a server, the host environment 150 may include the devices used provide the underlying execution environment of a server. In some cases, the device may be a device that is optional or otherwise removable and/or addable. Because not every configuration of the computer system 100 may include these types of devices, these devices may be referred to as add-on devices. For purposes of ease of description, only one add-on device 180 is shown. However, it should be understood that the host environment 150 may include any number of add-on devices 180. Example add-on devices may include network interface controllers, host bus adaptors, firmware, input/output cards, storage devices, applications, or any other type of device or resource that may be controlled by or otherwise communicate with the management controller 140. During system boot, the host environment 150 may initialize the add-on devices.

The host environment 150 may also include a host processor 181 and a computer-readable storage device 182. The host processor 181 may be a device suitable to read and execute processor executable instructions, such as a CPU or integrate circuit. The processor executable instructions may cause the host processor 181 to implement techniques described herein. For example, the host processor 181 my execute instructions for capturing and updating the boot progress phases. The host processor may include dual purpose boot registers 183. The dual purpose boot registers 183 may be registers of the processor that are designated to store data indicating a boot phase (e.g., a boot phase identifier) and boot status during the early boot phase of the computer system 100. After the early boot phase completes, the host processor 181 can use the dual purpose boot registers 183 as generic scratch registers. The dual purpose boot registers 183 can be any combination of designated boot progress model specific registers (MSRs), control and status registers (CSRs), general purpose registers, or the like. In the case where the host environment 150 is an Intel® processor architecture, these MSRs/CSRs could be part of encore hardware which are accessible from the outside the processor. For processor architectures which don't support such designated boot progress registers, examples of the host processor can use general purpose registers for capturing early progress events using architected bit patterns for capturing boot progress. For capturing boot progress logs of all cores in a processor socket, the host processor can have a 1-1 mapping of cores to boot progress registers. For processor architectures which do not support 1-to-1 mappings of cores to MSR/CSRs, examples can use the available number of bits inside these registers for capturing core specific boot progress information (e.g., mapping ranges of bits to cores).

The host processor 181 may be coupled to the computer-readable storage device 182. The computer-readable storage device 182 may contain thereon a set of instructions, which when executed by the host processor 181, cause the host processor 181 to execute the techniques described herein. For example, the computer-readable storage device may include early boot progress BIOS instructions 184 that updates the boot progress registers to reflect a boot phase and status. In this way, the early boot progress BIOS instructions 184 can be programmed to leave a trail of major phases of early boot and hardware initialization by writing bit patterns and any associated error codes in these boot progress MSR/CSRs. In any other implementation, the boot progress registers could get automatically programmed by hardware based on the steps taken to initialize the processor, chipset and associated hardware.

For processors that supports architected registers and atomic instruction set, the BIOS will update these designated boot progress registers as part of the first instruction to indicate the successful handover to BIOS reset vector. This information will be used during analysis of "dead on reboot" and "dead on arrival cases" and will help isolate issues during processor micro code initialization and power subsystem hardware supplying the required voltage to processor and associated hardware. For processors that support only generic registers, we define a generic bit pattern mapping to boot major phases, boot minor phases and available number of cores. For example, in a processor architecture with one generic 64 bit MSR and one core, the lower 32 bits of the register could be used to indicate 32 early major boot phases and minor phases with each bit corresponding to a particular early boot phase/sub phase. In a different implementation, the same 32 bits can be used as counters for each major boot phase giving a total of or 2 power 32 phases which can cover possible cases for early initialization. The upper 32 bits can be used to indicate the severe most error code (if any) detected in that early phase. Alternatively, the upper 32 bits for error codes can be split further to 48 bit error code segments for retrieving the error codes associated with different severity level (e.g., warning, critical, fatal, etc.).

The computer system 100 may include communication interfaces between the components of the computer system 100. For example, the management controller 140 and the host environment 150 may include a side-band interface 122 for the management controller 140 to read or otherwise access the dual purpose boot registers, Some examples of the side-band interface 122 are Inter-Integrated Circuit (I2C), Platform Environment Control Interface (PECI) and debug interfaces, such as, for example, Joint Test Action Group (JTAG). The side-band interface 122 can be accessible with auxiliary power and the management controller can use this interface to implement real-time monitoring and analysis of boot progress logs during early boot until the BIOS initializes the primary communication interfaces to the management controller.

The computer system 100 may also include a primary communication interface 124. An example of primary communication interfaces may include, but are not limited to, such high speed links, such as peripheral component interconnect (PCI), PCI eXtended (PCI-e), accelerated graphic ports, PCI express (PCIe), or any other suitable communication interface powered by the host environment. The primary communication interface 124 may be a communication interface that is initialized during the boot-up of the host environment 150.

Continuing with FIG. 1, the management controller 140 and/or the host environment 150 may be coupled to a computer-readable storage device 162. The computer-readable storage device 162 may contain thereon data relating to a platform capability abstraction definition 164. The platform capability abstraction definition 164 can specify the capability of processor, like the number of generic boot phase registers, the addresses of the dual purpose registers, the physical interfaces for the dual purpose registers, the bit patterns, and so forth. The platform capability abstraction definition 164 can be used by the management processor to read and decode the bit patterns of the dual purpose boot registers 183.

It is to be appreciated that FIG. 1 shows one example arrangement of a system and that other examples can use different arrangements than that shown in FIG. 1. For example, in some examples, the platform capability abstraction definition 164 may be stored in either the computer-readable storage device 142 or 182. Further, more or less communication interfaces may be used to connect the components of the computer system 100.

Figure 2:
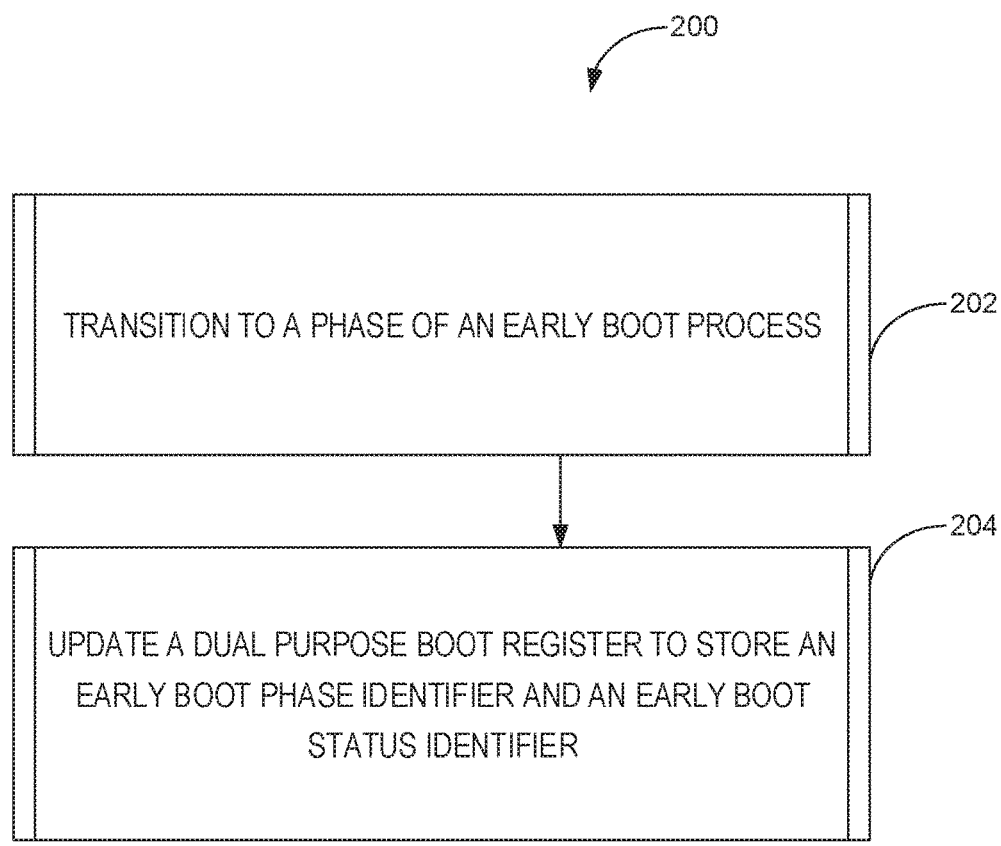
FIG. 2 is a flowchart illustrating a method for a host processor to signal early boot errors using dual purpose boot registers, according to an example.

Operations for detecting early boot errors are now described in greater detail. For example, FIG. 2 is a flowchart illustrating a method 200 for a host processor to signal early boot errors using dual purpose boot registers, according to an example. The method 200 may be performed by the modules, components, systems shown in FIG. 1 and, accordingly, is described herein merely by way of reference thereto. For example, the method 200 may be performed by the host processor 181 when executing the early boot progress BIOS instructions 184. It will be appreciated that the method 200 may, however, be performed on any suitable hardware.

The method 200 may begin at operation 202 when the host processor transitions to a phase of an early boot process. For example, the host processor may transition to the phase of an early boot process upon a system reset, which causes the host processor to execute a hand over to the BIOS reset vector.

At operation 204, based on the transition to the phase, the host processor may update the dual purpose boot register to store an early boot phase identifier and an early boot status identifier. In some cases, the representation of the early boot phase identifier and the early boot status identifier may be dictated based on the platform capability abstraction definition.

As discussed above, the dual purpose register may be accessible by the management controller through a side-band interface. Thus, as discussed below, the management controller may poll or read the dual purpose register to track the early boot progress and status.

The method 200 may continue loop through operation 202 and 204 until the early boot phase is complete. As discussed above, an early boot phase completes when the host system initialization is complete and the high speed link between the host environment and the management controller is established. Each iteration of the method 200 may correspond to atomic instructions in the early boot progress BIOS instructions.

After the method 200 completes and the early boot process has successfully completed, the host processor may use or otherwise treat the dual purpose registers as scratch registers.

Figure 3:
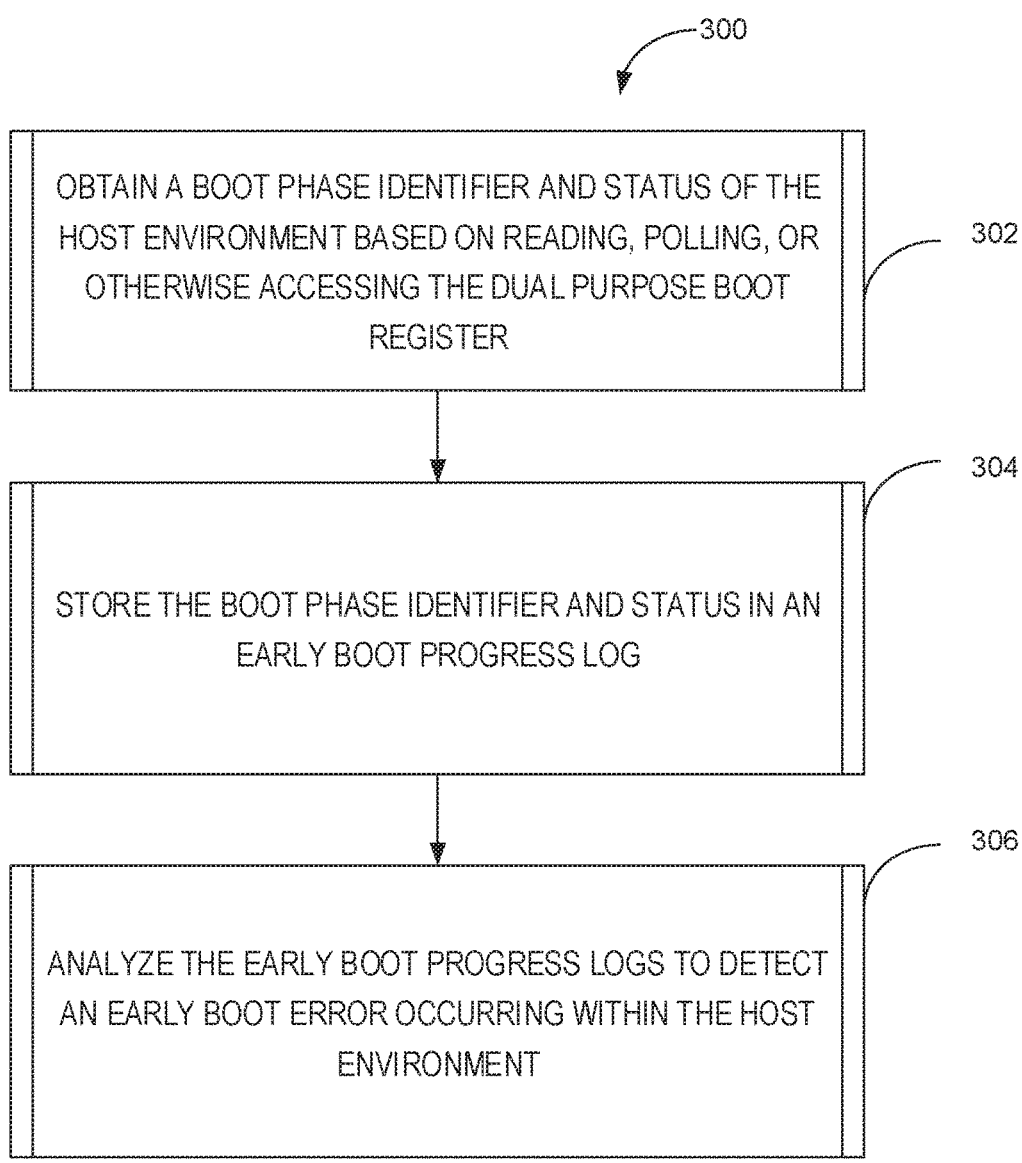
FIG. 3 is a flowchart illustrating a method for a management processor to track early boot errors occurring within a host environment, according to an example.

As just discussed, examples of the host processor may update dual purpose boot registers to indicate early boot phases and status information. The management controller may read or poll the dual purpose boot registers to track the early boot phases and status, which is now described. FIG. 3 is a flowchart illustrating a method 300 for a management processor to track early boot errors occurring within a host environment, according to an example. The method 300 may be performed by the modules, components, systems shown in FIG. 1 and, accordingly, is described herein merely by way of reference thereto. For example, the method 300 may be performed by the management processor 141 when executing the instructions 144, 145. It will be appreciated that the method 300 may, however, be performed on any suitable hardware.

The method 300 may begin at operation 302 when the management processor, when executing the boot progress monitor instructions 144, obtains a boot phase identifier and early boot status identifier of the host environment based on reading, polling, or otherwise accessing the dual purpose boot register. The management processor may read, poll, or otherwise access the dual purpose boot register through the side-band interface.

At operation 304, the management processor, when executing the boot progress monitor instructions, may then store the boot phase identifier and early boot status identifier in an early boot progress log in the computer readable storage device.

The operation 302 may be initiated when the management controller detects a system reset command. Further, operations 302 and 304, together, may iterate until the completion of early boot phase, which can be detected by successful initialization of the primary communication link.

At operation 306, the management processor, when executing the boot progress analyzer instructions, may analyze the early boot progress logs to detect early boot errors occurring within the host environment. In some cases, operation 306 may involve decoding the early boot progress logs based on the platform capability abstraction definition. Thus, prior to analyzing the early boot progress logs, the management processor may access the platform capability abstraction definition. Based on the platform capability abstraction definition, the management processor can determine a bit mapping between register value to boot phase or boot status code. Further, also based on the platform capability abstraction definition, the management processor can determine a mapping between a processor core and a register bit range or register.

In some cases, the operation 306 may involve the management processor executing a user configured action based on a detected error. In this way, the management controller includes the ability for users (e.g., administrators) to configure actions that can be taken by the management processor when specified errors are detected during the early boot process. Such user configured actions may be stored as an error rule that includes a trigger condition and a trigger action. When data from the early boot progress logs match a trigger condition, the corresponding trigger action may be executed by the management processor.

Figure 4:
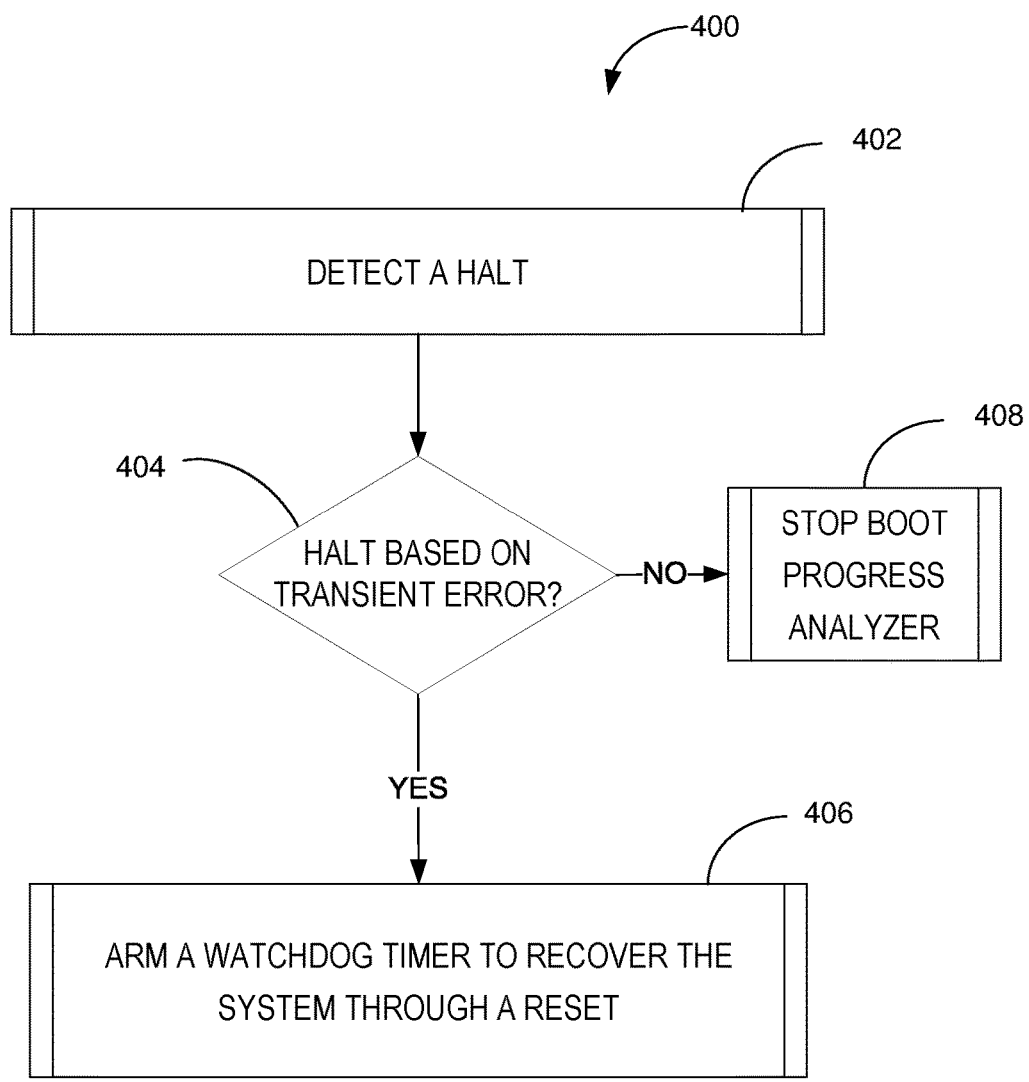
FIG. 4 is a flowchart of a method for handling transient errors, according to an example.

Additionally or alternatively, the operation 306 may involve the management processor attempting to recover from a transient error. A transient error, as used herein, may refer to an error condition that occurs intermittently, variably, or non-deterministically. An example of a transient error is where a bit, for some nondeterministic reason, takes an incorrect value (e.g., takes a 0 value rather than a 1). FIG. 4 is a flowchart of an example method 400 for handling transient errors, according to an example.

The method 400 may begin at operation 402 when the management processor detects a halt to the early boot process. At decision 404, the management processor may determine whether the early boot process halted based on a transient error. If yes, the management processor may, at operation 406, arm a watchdog timer to recover the system through a reset. Otherwise, at operation 408, the management processor may determine that the early boot process has completed and stop the boot progress analyzer.

What is claimed is:

1. A method comprising:
   transitioning, by a host processor, to a first phase of an early boot process, the early boot process occurring before the host processor initializes a primary link between the host processor and a management controller;
   updating a dual purpose boot register of the host processor to store an early boot phase identifier corresponding to the first phase and an early boot status identifier corresponding to the first phase, wherein a first bit range of the dual purpose boot register is to store a plurality of early boot phase identifiers corresponding to a plurality of early boot phases, and a second bit range of the dual purpose boot register is to store a plurality of early boot status identifiers corresponding to a plurality of early boot error codes;
   obtaining, by the management controller, the early boot phase identifier and the early boot status identifier of the host environment by accessing the dual purpose boot register through a side-band interface between the management processor and the host processor;
   storing, by the management controller, the early boot phase identifier and the early boot status identifier in an early boot progress log; and
   detecting, by the management controller, an early boot error occurring within the host environment based on the early boot progress log.

2. The method of claim 1, further comprising:
   detecting a completion of the early boot process; and
   responsive to the completion of the early boot process, using the dual purpose boot register as a scratch register.

3. The method of claim 1, wherein the management controller accesses the dual purpose boot register through the side-band interface prior to an initialization of the primary link between the host processor and the management controller.

4. The method of claim 1, wherein the side-band interface is powered by an auxiliary power source.

5. The method of claim 1, wherein the first phase identifier maps to a bit location in the dual purpose register.

6. The method of claim 1, wherein the first phase identifier maps to a value stored in a portion of the dual purpose register.

7. The method of claim 1, wherein the early boot phase identifier and the early boot status identifier are stored in the dual purpose boot register according to a platform abstraction definition.

8. The method of claim 1, further comprising:
   transitioning, by the host processor, to a second phase of the early boot process; and
   updating the dual purpose boot register to store a second early boot phase identifier corresponding to the second phase and a second early boot status identifier corresponding to the second phase.

9. A device comprising:
   a side-band interface communicatively coupled to a host environment;
   a processor coupled to the side-band interface; and
   a computer-readable storage device coupled to the processor, the computer-readable storage device including instructions to cause the processor to:
      obtain a early boot phase identifier and early boot status identifier of the host environment based on accessing a dual purpose boot register of a host processor through the side-band interface, wherein a first bit range of the dual purpose boot register is to store a plurality of early boot phase identifiers corresponding to a plurality of early boot phases, and a second bit range of the dual purpose boot register is to store a plurality of early boot status identifiers corresponding to a plurality of early boot error codes;
      store the early boot phase identifier and the early boot status identifier in an early boot progress log; and
      analyze the early boot progress log to detect an early boot error occurring within the host environment.

10. The device of claim 9, wherein the processor is to analyze the early boot progress log based on decoding the early boot progress log according to a platform capability abstraction definition.

11. The device of claim 10, wherein the platform capability abstraction definition specifies a mapping between the dual purpose boot register and a core within the host environment.

12. The device of claim 9, wherein the processor is to analyze the early boot progress log based on comparing the early boot progress log with a user supplied error rule.

13. The device of claim 9, wherein the processor is further to: determine that the early boot progress log indicates a transient error; and arm a watchdog timer to recover the system through a reset.

14. The device of claim 9, wherein the processor is to access the dual purpose boot register through the side-band interface prior to an initialization of a primary link between the host environment and the device.

15. A system comprising:
   a host device comprising a host processor;
   a management controller;
   a side-band interface communicatively coupling the host device to the management controller;
   wherein the host processor is to:

transition to a phase of an early boot process, the early boot process occurring before the host processor initializes a primary link between the host processor and a management controller; and update a dual purpose boot register of the host processor to store an early boot phase identifier corresponding to the first phase and an early boot status identifier corresponding to the first phase, the dual purpose register being accessible through the side-band interface, wherein a first bit range of the dual purpose boot register is to store a plurality of early boot phase identifiers corresponding to a plurality of early boot phases, and a second bit range of the dual purpose boot register is to store a plurality of early boot status identifiers corresponding to a plurality of early boot error codes; and wherein the management controller is to:
access the early boot phase identifier and the early boot status identifier stored in the dual purpose boot register through the side-band interface;
store the early boot phase identifier and the early boot status identifier in an early boot progress log; and
detect an early boot error occurring within the host environment based on the early boot progress log.

16. The system of claim 15, wherein the side-band interface is powered by an auxiliary power source.

17. The system of claim 15, wherein the management controller is to access the early boot phase identifier and the early boot status identifier of the host environment through the side-band interface prior to an initialization of the primary link between the host processor and the management controller.

* * * * *